United States Patent [19]
Termin et al.

[11] 3,716,567
[45] Feb. 13, 1973

[54] SIMULTANEOUS PRODUCTION OF ALCOHOLATES AND TRIVALENT TITANIUM COMPLEXES OF BETA-DIKETONES

[75] Inventors: Erich Termin, Laufenburg; Gerhard Hauck, Troisdorf-Sieglar, both of Germany

[73] Assignee: Dynamit Nobel A G, Troisdorf, Germany

[22] Filed: Sept. 8, 1970

[21] Appl. No.: 70,580

[30] Foreign Application Priority Data

Sept. 6, 1969 Germany.................P 19 45 303.3

[52] U.S. Cl..........260/429.5, 260/429 J, 260/632 A
[51] Int. Cl.................................................C07f 7/28
[58] Field of Search............260/429.5, 632 A, 429 J

[56] References Cited

UNITED STATES PATENTS

| | | | |
|---|---|---|---|
| 2,000,329 | 5/1935 | Heisel et al. | 260/632 A |
| 3,002,854 | 10/1961 | Brill | 260/429.5 X |
| 3,004,863 | 10/1961 | Gray et al. | 260/429.5 X |
| 3,061,623 | 10/1962 | Mador et al. | 260/429.5 |

FOREIGN PATENTS OR APPLICATIONS

| | | | |
|---|---|---|---|
| 1,081,880 | 5/1960 | Germany | 260/429.5 |
| 1,091,105 | 10/1960 | Germany | 260/429.5 |

OTHER PUBLICATIONS

Chem. Abstracts, Vol. 50, 15413d (1956)
Chem. Abstracts, Vol. 48, 9254a (1954)
Chem. Abstracts, Vol. 52, 2719g (1968)
MacCorquodale et al., J. Amer. Chem. Soc. Vol. 50, pp. 1,938–1,939 (1928)

*Primary Examiner*—H. Sneed
*Attorney*—Burgess, Dinklage & Sprung

[57] ABSTRACT

Tetravalent titanium alcoholate-beta diketone complexes, e.g. titanium isopropylate-triacetylacetonate, are reacted with an alkali metal amalgam in a non-polar solvent to reduce the titanium to trivalent state, forming, for example, titanium triacetylacetonate and sodium isopropylate. The sodium isopropylate is a crystalline precipitate which can be removed by filtration; the amalgam can be decanted off and reused, as in alkali metal chloride electrolysis, to restore its alkali metal content so as to be ready for re-cycling.

9 Claims, No Drawings

SIMULTANEOUS PRODUCTION OF ALCOHOLATES AND TRIVALENT TITANIUM COMPLEXES OF BETA-DIKETONES

The present invention relates to the reduction of the titanium in tetravalent titanium alcoholate beta-diketone complexes by means of alkali metal, present as an amalgam, to yield trivalent titanium Beta-diketone complexes and alkali metal alcoholates.

It is known that beta-diketone complexes of trivalent titanium can be prepared by reduction of beta-diketone complexes of tetravalent titanium dissolved in organic solvents. As reducing agents, there have been used organometal compounds, viz. alkyl and aryl compounds of the metals of main Groups I, II and III of the periodic system such as p-tolyllithium, phenylmagnesium bromide and diethylaluminum monochloride, and metals and metal compounds, such as magnesium, zinc, sodium and chromium-(II) chloride. As tetravalent titanium-containing complexes to be reduced by this method, either pure beta-diketone complexes or complex beta-diketone-titanium-IV halides may be used. This known method, however, has several drawbacks including the fact that the solutions which result have dissolved therein both the desired end product and undesired byproduct. A separation of these dissolved substances by evaporation of the solvent and subsequent sublimation is very complicated. Furthermore, the separation of the solutions, e.g. from excess zinc dust, is difficult because of a tendency of the solids to remain suspended.

In another vein, it is known to make alkali alcoholates by decomposition of alkali metal amalgams with alcohols. Industrially, this method is used, however, only with methyl and ethyl alcohols, as can be inferred, for example, form the treatise in Russian Chemical Review, Vol. 34, No. 3, P. 161 – 185 (1965). With higher alcohols, the reaction proceeds only very slowly and with poor yields based on amalgam. Therefore, a direct conversion of the alcohols with the expensive, pure alkali metals at higher temperatures is generally avoided in these cases. One could, however, also use other expensive methods, such as for example the decomposition of alkali metal hydrides with alcohols and the reaction of alkali metal amines with alcohols in liquid ammonia etc., as likewise described in the above literature.

In the normal amalgam decomposition with alcohols considerable effort must be expended in the processing and concentration of the reaction products. With the higher alcoholates, in consequence of the high temperatures required to concentrate the raw product, a yellowing of the product often takes place.

It is accordingly an object of the invention to provide simple techniques to effect the reduction of tetravalent titanium complexes and simultaneously to effect the production of alkali metal alcoholates, the desired products being obtained in high yield and being readily recoverable.

In accordance with the present invention there is provided a process wherein a tetravalent titanium alcoholate-complex of a beta-diketone is reacted with an alkali metal amalgam in a non-polar organic solvent. The reaction proceeds at ambient temperatures although temperatures as low as 0° C. and as high as 120° C. may be employed. Alkali metal alcoholate precipitates from the solution and may be separated by filtration from the dissolved trivalent titanium complex which contains one less alcoholate group than initially.

Titanium-IV-alcohol beta-diketone complexes suited as starting materials are monoalcoholate-tri-beta-diketones, dialcoholate-di-beta-diketones and trialcoholate-mono-beta-diketones. According to the invention, the preferred procedure is to form the beta-diketone complex in situ by mixing in an enameled vessel the respective titanium tetraalcoholate and the respective diketone in the molar ratio 1:3, 1:2 or 1:1. Possibly cooling may be necessary since the reaction is exothermic. The tetravalent titanium-alcoholate-beta-diketone complex then forms instantaneously. As starting substance, the mono-alcoholate-tri-beta-diketone is preferred, i.e. the reaction product of the tetraalcoholate and three moles of beta-diketone. Preferred beta-diketones include acetylacetone (pentanedione-2,4), esters of acetoacetic acid such as ethyl acetoacetate, and the like.

As alkali metal amalgams, sodium and potassium amalgams obtained in electrolysis of their halides are preferred. The amalgams usually contain about 0.2 to 0.4 percent by weight of the alkali metal. Preferred are amalgams containing about 0.4 percent by weight of alkali metal. Preferably the alkali metal is used in excess related to the titanium, desirably from about 1.2 to 1.8 times the stoichiometric molar amount, i.e. in about 20 to 80 percent excess.

As solvents for the process according to the invention those organic solvents are used in which the resulting trivalent titanium-beta-diketone complexes are soluble, and in which the simultaneously produced alkali metal alcoholates, on the other hand, are insoluble. Suited therefore are aromatic, e.g. monocyclic, hydrocarbons such as benzene, toluene, xylene and mixtures thereof, and also mixtures of aromatics with aliphatics and/or cycloaliphatics, such as the hydrocarbons hexane, heptane and cyclohexane. According to the invention, the solvent is preferably used in about 1 to 9, and preferably about 3 to 9 times the weight of the tetravalent titanium-alcoholate-beta-diketone complex, i.e. the concentration of complex in solvent, excluding other substances, is about 10 to 50 percent by weight, preferably 10 to 25 percent by weight.

In the method according to the invention the preferred procedure is to first place the alkali metal amalgam and the solvent in an enameled or glass vessel, and then slowly add, under agitation and cover of a protective gas (preferably nitrogen), the previously prepared tetravalent titanium-alcoholate-beta-diketone complex.

Surprisingly, the conversion according to the invention, despite the relatively low concentration of the reaction partners, proceeds smoothly and with quantitative yields based on the alkali metal content of the amalgam. Preferably, room temperature is used although lower and higher temperatures, e.g. between 0° and 120° C, can also be used insofar as operation at higher temperatures is permitted by the boiling points of the solvents.

The alkali metal alcoholate is obtained in crystalline form, while the complex solution turns deep blue to violet. The entire resultant suspension can in simple manner be separated from the amalgam or mercury by drawing off the latter or by decantation.

The thus present end products, viz. the alkali metal alcoholate and the solution of the beta-diketone complex of the trivalent titanium, may be separated from each other by filtration under a protective gas cover. The alkali metal alcoholate is washed with the respective solvent and then, preferably in vacuum and a temperatures of about 50° C., dried to yield pure, white crystals.

In many cases, the filtrate, i.e. the solution of the beta-diketone complex of trivalent titanium can be used directly or it can be concentrated partially or completely by distilling off the solvent.

The amalgam or mercury separated from the products obtained according to the invention and impoverished in alkali metals may, if desired, be washed with the respective organic solvent and recycled to the alkali electrolysis in which it will become enriched with alkali metal so as to be capable of re-use in the process.

As advantages of the method according to the invention, two desirable products are obtained by a simple procedure at the same time. A very complicated separation of solutions of the end products and of solutions of by-products is unnecessary, a simple filtration sufficing instead. Likewise the expensive sublimation and separation of suspension-prone solid reducing agents, previously required, are no longer necessary.

By this process it is possible to obtain especially effectively and easily the alkali metal alcoholates of the higher alcohols, e.g. branched alkanols of three to 18 carbon atoms, whose production by prior art methods is difficult and highly expensive.

Both alkali metal alcoholates and beta-diketone complexes of trivalent titanium are of considerable importance for industry. Alkali metal alcoholates are used, as is known for example, as condensation catalysts in the organic synthesis of pharmaceuticals and the like. The trivalent titanium complexes find application, for example, as polymerization catalysts and are also suited as anti-knock compounds.

The invention thus constitutes an important enrichment of technology.

The invention will be further described with reference to the following examples wherein all parts are by weight unless otherwise expressed.

EXAMPLE 1

In an enameled vessel with cooling device and stirrer, there were added to 198.0 kg of titanium tetraisopropylate 209.0 kg of acetylacetone over a period of 60 minutes. There then formed titanium isopropylate-triacetylacetonate.

Into a second enameled vessel with a slowly running agitator there were introduced 960.0 kg of benzene and 5,600 kg of sodium amalgam, from a sodium chloride electrolysis, containing 0.4 percent by weight of sodium. To this mixture, over 200 minutes there was slowly added the previously prepared, dissolved titanium complex. A deep blue suspension resulted. After completion of the reaction, the amalgam layer was drawn off and recycled to the sodium chloride electrolysis, the suspension then being filtered under exclusion of air. The filtrate constituted an approximately 20 percent by weight solution of titanium triacetylacetonate. The residue from the filtration was washed with benzene and dried under vacuum at 50°C.

The yield of sodium isopropylate amounted to 70 kg (i.e. 87 percent of the theory based on sodium in the amalgam). The yield of titanium-triacetyl-acetonate was maximal, i.e. approximately 100 percent of theory based on starting titanium.

EXAMPLES 2, 3 and 4

The same procedure was followed as in Example 1, except that instead of sodium amalgam and titanium tetraisopropylate, potassium amalgam and titanium tetrabutylate were used, the solvent was toluene and different titanium complex concentrations were employed. The potassium content in the amalgam was 0.3 percent by weight. In all three examples, potassium-n-butylate and a solution of titanium-triacetylacetonate were obtained.

The test conditions and results are given in the table that follows.

TABLE

| Ex. No. | Potassium amalgam, kg | Acetyl-acetone, g | Titanium tetra-n-butylate, g | Toluene | Potassium-n-butylate | | Ti-triacetyl-acetonate | |
|---|---|---|---|---|---|---|---|---|
| | | | | | g | % of theory | %Content of soln | % of theory |
| 2 | 2 | 38.0 | 42.5 | 400 | 13 | 85 | 10.8 | 100 |
| 3 | 3 | 75.0 | 85.0 | 400 | 24 | 93 | 21.0 | 98 |
| 4 | 4 | 150.0 | 170.0 | 400 | 27 | 84 | 41.0 | 97 |

EXAMPLE 5

The same procedure as in Example 1 was followed. The amounts of the starting substances used were as follows:

426.0 g titanium tetraisopropylate
450.0 g. acetylacetone
1,200 ml benzene
19.0 kg sodium amalgam (0.3 percent sodium)

An approximately 28 percent by weight solution of titanium-triacetylacetonate was obtained along with 168 g of sodium isopropylate.

EXAMPLE 6

The same procedure as in Example 5 was followed, except that instead of 450 g of acetylacetone, 585 g of ethyl acetoacetate was employed and, instead of sodium amalgam, 20.0 kg of potassium amalgam (0.22 percent by weight) were used.

The run gave 90 g of potassium isopropylate and a blue-violet colored solution containing titanium tris-(ethyl acetoacetate) to the extent of about 32 percent by weight.

It will be appreciated that the instant specification and examples are set forth by way of illustration and not limitation, and that various modifications and changes may be made without departing from the spirit and scope of the present invention.

What is claimed is:

1. The process which comprises reacting a complex of tetravalent titanium and from 1 to 3 times the molar amount of a beta-diketone selected from the group consisting of pentanedione and esters of acetoacetic acid, the balance of the titanium valences being complexed with an aliphatic alcohol containing from three to 18 carbon atoms, with an alkali metal amalgam in a non-polar organic solvent, to produce a trivalent titanium-beta1diketone complex and alkali metal alcoholate.

2. The process according to claim 1, wherein the amalgam is used in excess up to 1.8 times the stoichiometric amount of the tetravalent titanium complex.

3. The process according to claim 1, wherein the reaction product is decanted to separate it from the amalgam and is filtered to remove solid alcoholate, there remaining a solution of the titanium complex in the solvent.

4. The process according to claim 3, wherein the amalgam is passed to an alkali metal chloride electrolysis for replenishment of its alkali metal content to a concentration of about 0.2 to 0.4 percent by weight, the restored amalgam then being recycled for further reaction.

5. The process according to claim 2, wherein the alkali metal is present in at least about 20 percent excess relative to the tetravalent titanium complex.

6. The process according to claim 1, wherein the tetravalent titanium complex comprises three molecules of beta-diketone and one of said alcohol.

7. The process according to claim 1, wherein said non-polar solvent comprises a major amount by volume of an aromatic hydrocarbon.

8. The process according to claim 7, wherein the balance of said solvent comprises an aliphatic or cycloaliphatic hydrocarbon.

9. The process according to claim 8, wherein the tetra-valent titanium complex comprises three molecules of beta-diketone and one of said alcohol and is formed in situ from titanium tetraalcoholate and beta-diketone, the amalgam being used in about 20 to 80 percent excess based on the titanium, the reaction product being decanted from the amalgam and being filtered to remove solid alkali metal alcoholate from the solution of titanium tri-beta-diketone complex, the amalgam being passed to an alkali metal chloride electrolysis for replenishment of its alkali metal content to a concentration of about 0.2 to 0.4 percent by weight, the restored amalgam then being recycled for further reaction.

* * * * *